(12) United States Patent
Whitehead et al.

(10) Patent No.: US 7,368,723 B2
(45) Date of Patent: May 6, 2008

(54) DIAMOND RADIATION DETECTOR

(76) Inventors: Andrew John Whitehead, 60 Cheylesmore Drive, Frimley, Camberley, Surrey GU16 9BW (GB); Geoffrey Alan Scarsbrook, 40 Cavendish Mead, Sunninghill, Ascot, Berkshire SL5 9TD (GB); Daniel James Twitchen, 10 Park Drive, Sunningdale, Berkshire SL5 0BD (GB)

(*) Notice: Subject to any disclaimer, the term of this patent is extended or adjusted under 35 U.S.C. 154(b) by 0 days.

(21) Appl. No.: 10/526,403

(22) PCT Filed: Sep. 4, 2003

(86) PCT No.: PCT/IB03/03762

§ 371 (c)(1),
(2), (4) Date: Sep. 20, 2005

(87) PCT Pub. No.: WO2004/023160

PCT Pub. Date: Mar. 18, 2004

(65) Prior Publication Data

US 2006/0071169 A1    Apr. 6, 2006

(30) Foreign Application Priority Data

Sep. 6, 2002    (GB) .................. 0220767.8

(51) Int. Cl.
*G01T 1/00* (2006.01)
(52) U.S. Cl. .............................. 250/370.01
(58) Field of Classification Search ........... 250/370, 250/370.01

See application file for complete search history.

(56) References Cited

U.S. PATENT DOCUMENTS

| 2,806,145 | A | * | 9/1957 | Cotty ................. 250/370.01 |
| 4,266,138 | A | * | 5/1981 | Nelson et al. ............ 378/34 |
| 4,465,932 | A | * | 8/1984 | Burgemeister ......... 250/370.07 |
| 5,079,425 | A |   | 1/1992 | Imai et al. |
| 5,210,430 | A | * | 5/1993 | Taniguchi et al. ......... 257/103 |
| 5,216,249 | A | * | 6/1993 | Jones et al. ........... 250/370.05 |
| 5,527,565 | A | * | 6/1996 | Nam et al. ................ 427/535 |
| 5,773,830 | A | * | 6/1998 | Lu et al. ............... 250/370.01 |
| 2004/0182308 | A1 | * | 9/2004 | Scarsbrook .............. 117/68 |
| 2004/0221795 | A1 | * | 11/2004 | Scarsbrook et al. ........ 117/68 |
| 2007/0148079 | A1 | * | 6/2007 | Scarsbrook et al. ....... 423/446 |

FOREIGN PATENT DOCUMENTS

| EP | 0 736 780 | | 10/1996 |
| WO | WO/99/64892 | * | 12/1999 |
| WO | WO 0169285 A1 | * | 9/2001 |
| WO | 01 96633 | | 12/2001 |

OTHER PUBLICATIONS

Isberg J., Hammersberg J., Johansson E., Wikstrom T., Twitchen D., Whitehead A., Coe S., Scarsbrook G.; "High Carrier Mobility in Single-Crystal Plasma-Deposited Diamond"; Sep. 6, 2002; Science; vol. 297; pp. 1670-1972.*

(Continued)

*Primary Examiner*—David Porta
*Assistant Examiner*—David S Baker
(74) *Attorney, Agent, or Firm*—Oblon, Spivak, McClelland, Maier & Neustadt, P.C.

(57) ABSTRACT

A method of detecting radiation that includes providing a layer of high purity single crystal CVD diamond, applying an electric field of no greater than 0.5 V/µm to the layer, exposing the layer to the radiation thereby generating a signal, and detecting the signal.

23 Claims, 3 Drawing Sheets

OTHER PUBLICATIONS

Schmid G.J., Koch J.A., Lerche R.A., Moran M.J.; "A Neutron Sensor Based on Single Crystal CVD Diamond"; Mar. 29, 2004; Nuclear Instruments & Methods in Physics Research Section A; vol. 527; pp. 554-561.*

Twitchen D.J., Whitehead A.J., Coe S.E., Isberg J., Hammersberg J., Wikstrom T., Johansson E.; "High-Voltage Single-Crystal Diamond Diodes"; May 2004; IEEE Transactions on Electron Devices; vol. 51; No. 5; pp. 826-828.*

Isberg J., Hammersberg J., Bernhoff H., Twitchen D.J., Whitehead A.J.; "Charge Collection Distance Measurements in Single and Polycrystalline CVD Diamond"; 2004; Diamond and Related Materials; vol. 13; pp. 872-875.*

Pernegger H., Roe S., Weilhammer P., Eremin., Frais-Kolbl H., Griesmayer E., Kagan H., Schnetzer S., Stone R., Trischuk W., Twitchen D., Whitehead A.; "Charge-Carrier Properties in Synthetic Single-Crystal Diamond Measured with the Transient-Current Technique"; 2005; Journal of Applied Physics; vol. 97; pp. 073704.1-073704.9.*

Barberini L et al: "Test on far UV irradiation of CVD diamonds" Nuclear Instruments & Methods in Physics Research, Section—A: Accelerators, Spectrometers, Detectors and Associated Equipment, vol. 442, No. 1-3, pp. 400-403, Mar. 2000.

* cited by examiner

US 7,368,723 B2

DIAMOND RADIATION DETECTOR

BACKGROUND OF THE INVENTION

This invention relates to a diamond radiation detector. Diamond is well known as a potential radiation detector. Its advantages include high radiation hardness, high thermal conductivity, rigidity, and simplicity of the detector design. However, its application has not been as widespread as anticipated, because of a range of practical problems.

Polycrystalline diamond radiation detectors are currently being assessed for a range of applications including particle detectors for the large hadron collider (LHC). In this application, radiation hardness is paramount, but another requirement is good separation of signal from background noise. Based on the particular signal characteristics exhibited by polycrystalline diamond, application of this material requires a charge collection distance (CCD) of at least 250 µm. The 250 µm collection distance is achieved by using very high quality polycrystalline diamond layers about 500 µm thick, and an applied field of 1 V/µm, equivalent to a voltage of about 500 V. It is found that the CCD in polycrystalline CVD diamond is a roughly linear function of the applied field up to about 1 V/µm, when the signal saturates, i.e. the CCD no longer increases when the field is increased.

Measurements of the CCD of natural single crystal diamond as a function of applied field suggest that it does not saturate at 1 V/µm, but continues to rise to much higher fields (see, for example, Zhao. S. (1994), PhD Thesis 'Characterization of the Electrical Properties of Polycrystalline Diamond Films', The Ohio State University) offering one route to higher CCD values, although exacerbating the problems of using higher voltages. However, the maximum CCD reached with such crystals is reported to be about 40 µm at 2 V/µm applied electric field.

WO 01/96633 discloses a high purity single crystal diamond produced by chemical vapour deposition (CVD). The diamond has a high resistivity, a high breakdown voltage in the off state, high electron mobility and hole mobility and a high collection distance. The diamond is described as being useful in electronic applications, particularly as a detector element or switching element.

SUMMARY OF THE INVENTION

It has now been found that high purity single crystal CVD diamond, particularly that described in WO 01/96633, can be used to make detectors in which high CCD is achieved and thus saturates at a surprisingly low applied field of no greater than 0.5 V/µm. This compares with about 1.0 V/µm for polycrystalline CVD diamond and about 2.0 V/µm for natural diamond.

Thus, the invention provides, according to a first aspect, a method of detecting radiation which includes the steps of providing a layer of high purity single crystal CVD diamond, applying an electric field of no greater than 0.5 V/µm to the diamond layer, exposing the diamond layer to the radiation causing a signal to be generated, and detecting the signal.

Further according to the invention, the electric field which is applied to the diamond layer is less than 0.3 V/µm, or less than 0.2 V/µm, or less than 0.15 V/µm.

Particularly in applications in which the applied voltage is the most restrictive parameter, the thickness of the diamond layer will generally be no greater than 1 mm, typically less than 500 µm and preferably less than 250 µm.

The layer will have major surfaces on opposite sides thereof and generally it will be one of these surfaces which will be exposed to the radiation.

The CVD diamond is high purity single crystal CVD diamond. Preferably, the CVD diamond will have one or more of the following characteristics:

(i) The CVD diamond layer operated under the above mentioned applied fields preferably operates at better than 80%, and more preferably better than 90%, and most preferably at better than 95% of the saturated charge collection efficiency. The saturated charge collection efficiency is the charge collection efficiency at which the particular layer saturates as the applied field is increased.

(ii) Particularly in thin layers, the biased voltage applied to the diamond may be less than 300 V, and preferably less than 200 V, and more preferably less than 75 V. The diamond layer operated under these applied voltages preferably operates at better than 80%, and more preferably better than 90%, and most preferably at better than 95% of the saturated charge collection efficiency.

(iii) The CVD diamond has a charge collection distance exceeding. 100 µm at an applied electric field of no greater than 0.5 V/µm. This collection distance is preferably greater than 200 µm, more preferably greater than 300 µm and better still greater than 400 µm at the applied electric field. It is preferred that these charge collection distances are achieveable at the lower applied electric fields described above.

(iv) It is desirable that the CVD diamond generates as high an electron count per detection event for minimum ionising particles as possible. Thus, it is preferred that the CVD diamond is such as to be capable of generating at least 7000, preferably at least 9000, more preferably at least 12000, and most preferably at least 15000 electrons per detection event when electrical fields, as described above, are applied.

(v) When the radiation is alpha particles, it is preferred that the CVD diamond is such that it generates a peak width (FWHM) in energy expressed as δE/E which is less than 20%, preferably less than 10%, more preferably less than 5% and still more preferably less than 3%.

The characteristics set out above can be found in the high purity single crystal CVD diamond described in WO 01/96633. Such single crystal CVD diamond also generally has at least one of the following characteristics:

(i) in the off state, a resistivity $R_1$ greater than $1 \times 10^{12}$ Ω cm, and preferably greater than $2 \times 10^{13}$ Ω cm, and more preferably greater than $5 \times 10^{14}$ Ω cm, all measured at an applied field of 50 V/µm and 300 K (or 20° C., which for the purposes of this invention is considered equivalent), (ii) a high breakdown voltage in the off state, and high current with long carrier life time in the on state and, more particularly, a µτ product greater than $1.5 \times 10^{-6}$ cm$^2$/V, and preferably greater than $4.0 \times 10^{-6}$ cm$^2$/V, and more preferably greater than $6.0 \times 10^{-6}$ cm$^2$/V, all measured at an applied field of 10 V/µm and 300 K. µ is the mobility and τ is the lifetime of the charge carriers, the product representing the contribution by a charge carrier to the total charge displacement or current. This characteristic can also be measured and expressed as a charge collection distance;

(iii) an electron mobility ($\mu_e$) measured at 300 K greater than 2400 cm$^2$V$^{-1}$s$^{-1}$, and preferably greater than 3000 cm$^2$V$^{-1}$s$^{-1}$, and more preferably greater than 4000

$cm^2V^{-1}s^{-1}$. In high quality type IIa natural diamond electron mobilities, at 300 K, are reported to be typically 1800 $cm^2V^{-1}s^{-1}$ with exceptional values reported up to 2200 $cm^2V^{-1}s^{-1}$;

(iv) a hole mobility ($\mu_h$) measured at 300 K greater than 2100 $cm^2V^{-1}s^{-1}$; and preferably greater than 2500 $cm^2V^{-1}s^{-1}$, and more preferably greater than 3000 $cm^2V^{-1}s^{-1}$. In high quality type IIa natural diamond, hole mobilities at 300 K are reported to be typically 1200 $cm^2V^{-1}s^{-1}$ with exceptional values reported up to 1900 $cm^2V^{-1}s^{-1}$;

(v) a high charge collection distance greater than 150 μm, and preferably at least 400 μm, and more preferably at least 600 μm, all collection distances being measured at an applied field of 1 V/μm and 300 K. In high quality type IIa natural diamond, charge collection distances are reported to be substantially less than 100 μm, and more typically about 40 μm at 300 K and an applied field of 1 V/μm.

The method of the invention detects radiation. It is to be understood that the term "detect" as used herein and in the claims, means not only detecting in a qualitative sense but also in a quantitative sense. For example, the method of the invention may be used to identify the existence of a particular radiation. The method of the invention may also be used to measure or count quantitatively a characteristic or property of radiation, e.g. the energy of radiation.

The detector described above has particular application in stand-alone, remote or hand-held devices.

DESCRIPTION OF EMBODIMENTS

Figure 1:
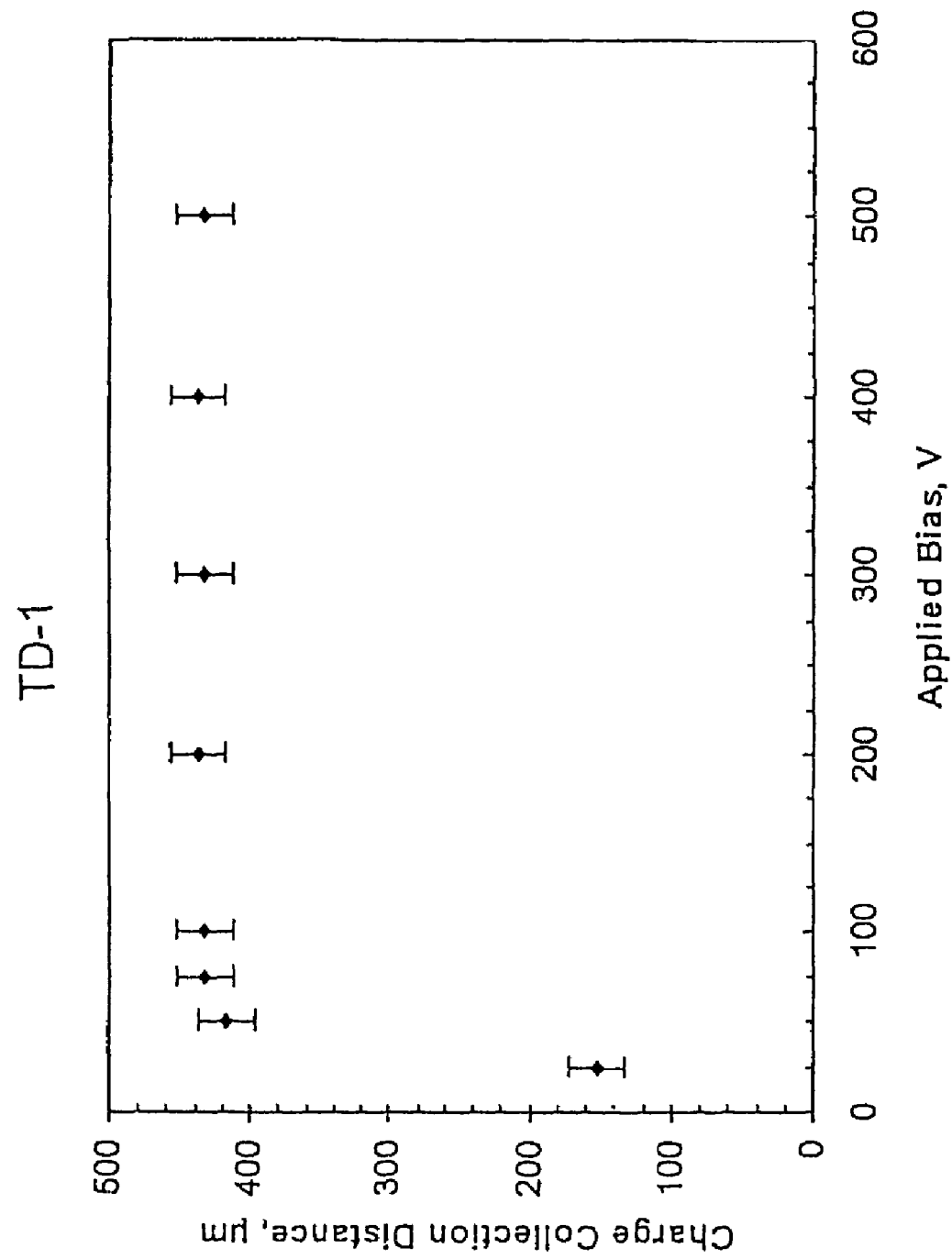
FIG. 1 is a plot of charge collection distance against applied bias voltage at various voltages.

The invention provides an improved radiation detector and its use in detecting radiation that provides useful functionality for example at lower operating voltages and applied fields compared with existing diamond detectors. The detector can be used for the direct detection of radiation such as beta particles (high energy electrons), alpha particles, protons, other high-energy nuclear particles (pions etc) and high-energy electromagnetic radiation (X-rays, gamma rays etc), and for the direct and indirect detection of neutrons. It is particularly suitable for use in stand-alone, hand-held and remote sensor systems.

Fundamentally, the invention is based on a single effect, that the charge carrier velocity in the diamond used in the method of the invention, previously found, for example, to saturate at remarkably high values as reported in WO 01/96633, has been found to saturate at remarkably low applied fields. The benefit of this can be utilised in a number of ways, dependent on the particular application. Four important ways of utilising this advantageous property are as follows:

a. Lower applied fields: Devices are best operated in the region where the charge carrier velocity is saturated, since in this region the performance of the device is insensitive to small variations in the applied voltage. Thus useful devices can now be operated at lower applied fields.

b. Lower applied voltages: Providing voltages in excess of several hundred volts may be expensive, difficult, or even impossible dependent on the application and design of the detector. The lower field for the saturation of charge carrier velocity allows useful devices to be operated with lower applied voltages whilst still operating with high charge collection efficiency and in the stable saturated charge velocity region, making for example high performance portable devices possible.

c. Higher charge collection: The primary signal detected by the external circuit attached to such detectors is the charge collected generally measured as the number of electrons. A higher collected charge enables improved threshold detection, simpler external circuitry, and better signal to noise in measurements based on quantitative analysis of the charge generated. Using thicker detector layers can realise higher charge collected, but the applied voltage would normally rise to maintain the same applied field. These benefits are now obtainable in a device operating under low applied field.

d. Faster response times: The response time of a detector is limited by the time taken to collect the charge. Achieving the saturation velocity at lower voltages enables fast response times in detectors operating at low applied fields.

As mentioned above, the detector of the invention may be used at much lower bias voltages than polycrystalline CVD diamond or natural diamond, for example. The use of lower bias voltages allows the detector to be used in less expensive, simpler systems, and in remote or hand-held devices. For example, a 200 μm thick high purity single crystal CVD diamond detector requires an applied voltage of 100 V or less to obtain adequate performance. A conventional detector based on a photo-multiplier tube (PMT) would require a supply voltage of, for example, 1 kV to operate. A particular example of remote detection where the reduced voltage would be a considerable benefit is the 'logging' of wells drilled for oil exploration. Here the detector is in a very hostile environment (both thermally and mechanically) and provision of a high voltage power supply is very difficult. The robust, low voltage, solid-state detector of the invention is much easier to operate than the conventional high voltage PMT-based detectors.

A further advantage of the detector of the invention is that since the detecting layer is thinner than known polycrystalline diamond and natural diamond detectors, the particles to be detected interact less with, and are thus affected less by, the detector. This is a very important consideration in applications such as high-energy physics (e.g. LHC).

The high purity single crystal CVD diamond layer which is used in the radiation detector of the invention is typically a polished plate between 10 μm and 1000 μm thick. Ohmic contacts may be formed either on both surfaces, as in a 'sandwich' structure, or on one surface only, as in an interdigitated array. Such ohmic contacts may be formed using methods known in the art.

A dc bias is applied between the two electrodes such that the field is the saturation field of the detector using a high-resistance supply (e.g. Keithley 237 Source-Measure Unit). One electrode is also connected to a charge measuring system, for example a charge sensitive amplifier, so that the signal can be read out.

The detector is placed in a beam of radiation, e.g. a beam of high-energy nuclear particles such as beta particles or pions and an output signal is monitored. When a particle transits the diamond layer, a signal will be generated and detected.

The invention will be illustrated by the following examples.

EXAMPLE 1

Beta Particle or High-Energy Nuclear Particle (e.g. Pion) Detector.

This is a detector that might be used as part of a high energy physics experiment such as the Compact Muon Solenoid detector of the large hadron collider.

A conventional diamond particle detector is made from the best available polycrystalline CVD diamond (see for example Adam, W. et al (2000), 'Micro-strip sensors based on CVD diamond', Nuclear Instruments and Methods in Physics Research A, 453, 141-148);. The detector is 500 µm thick. The detector is irradiated with, for example, beta particle from a strontium-90 source or pions or protons from a particle accelerator beam line. The detector yields, at a saturation bias of 500 V (equivalent to an electric field of 1 V/µm), about 7000 electrons per particle passing through the detector (ie per event). This is equivalent to a charge collection efficiency (CCE), $Q_m/Q_t$, of approximately 39%. The charge of 7000 electrons is sufficient for a particle detector to operate with current back-end signal processing electronics. The detector is made from a very thick (greater than 1.0 mm) polycrystalline CVD diamond plate, in which the detector properties increase from a minimum at the nucleation (or substrate) surface to a maximum at the growth surface. In order to obtain a satisfactory detector performance from the plate, a large amount of material is removed from the nucleation surface to form a plate thickness in use of about 500 µm.

A layer of high purity single crystal CVD diamond described in WO 01/96633, 500 µm thick, has been found to have a CCE of greater than 95%. Therefore to collect the required minimum of 7000 electrons per event, the detector only needs to be 200 µm thick. Further, it has been found that such detectors using such a diamond layer have a saturation field of 0.5 V/µm. These measurements indicate that it would be possible to reduce the thickness of the detector to 200 µm and the bias voltage to 100 V or less and still obtain satisfactory performance.

One such example is high purity single crystal CVD diamond sample TD-1. This sample is 450 µm thick and was prepared according to the method described in WO 01/96633. Ohmic contacts were prepared on each surface by the sequential deposition of titanium and gold layers, a technique well-known in the art, so that the sample could be biased with a high voltage power supply. The contacted sample was placed in front of a strontium-90 beta source and its detector performance, as exemplified by its charge collection properties, was evaluated. This technique is well-known in the art. The charge collection distance (CCD) as a function of applied voltage see (FIG. 1) rises very rapidly from zero and reaches a value of approximately 430 µm at an applied bias of approximately 80 V, equivalent to a field of approximately 0.18 V/µm, In this instance, the CCE is greater than 95%. With this sample, 95% CCE corresponds to the collection of just over 15000 electrons per event, and this CCE is achieved at an applied field of 0.2 V/µm. A typical set of detector signal processing electronics requires a minimum signal of approximately 7000 electrons per event, so this sample will deliver adequate performance at a thickness of 205 µm and an applied bias of 41 V.

Figure 2:
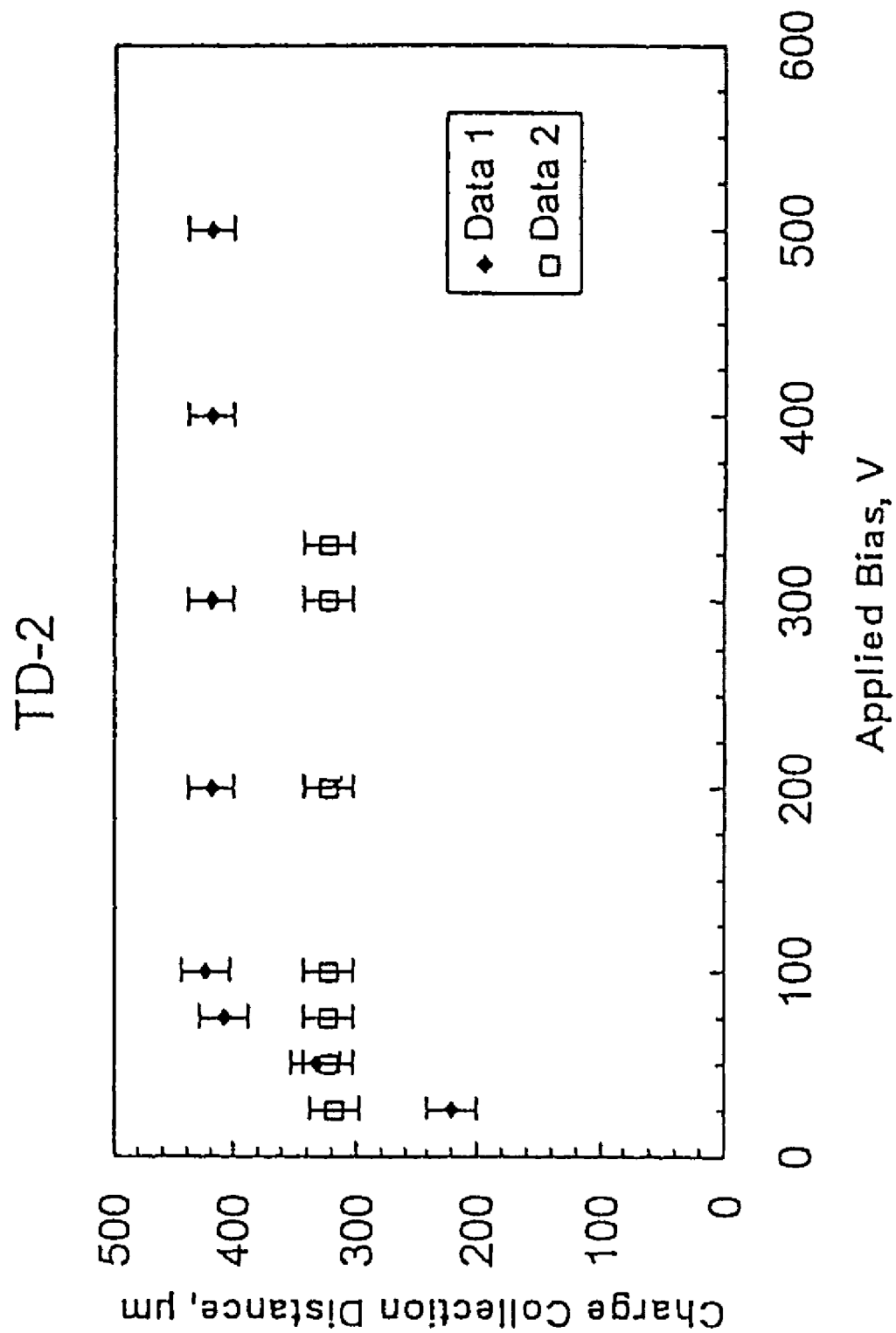
FIG. 2 is a plot of charge collection distance against applied bias voltage at various voltages.

A further sample, TD-2, produced by the method described in WO 01/96633 was initially prepared at a thickness of 440 µm. Testing with a strontium-90 source demonstrated a CCD of between 420 and 440 µm, equivalent to a CCE of between 95% and 100%, performance saturation occurring at between 75 V and 100 V (see Data 1 on FIG. 2). The thickness of TD-2 was reduced to 330 µm. This resulted in the saturation CCD decreasing to approximately 323 µm (equivalent to a CCE of 98% or approximately 11400 electrons per event), with the CCD saturating at an applied bias voltage of between 25 V and 50 V, equivalent to an applied field of 0.075 V/µm and 0.15 V/µm (see Data 2 on FIG. 2). If this sample were required to deliver a minimum signal of 7000 electrons per event, its thickness could be further reduced to 205 µm at a saturation field of 0.15 V/µm, requiring an applied bias of 31 V.

EXAMPLE 2

Alpha Particle Detector.

A high purity single crystal CVD diamond plate TD-3 produced by the method described in WO 01/96633, about 200 µm thick, is prepared with Ti—Au electrodes on both sides ('sandwich' configuration). It is connected to a 100 V bias and one electrode is connected to a multichannel analyser. The detector is irradiated in vacuum with 5.5 MeV alpha particles from an Americium-241 radioactive source.

Figure 3:
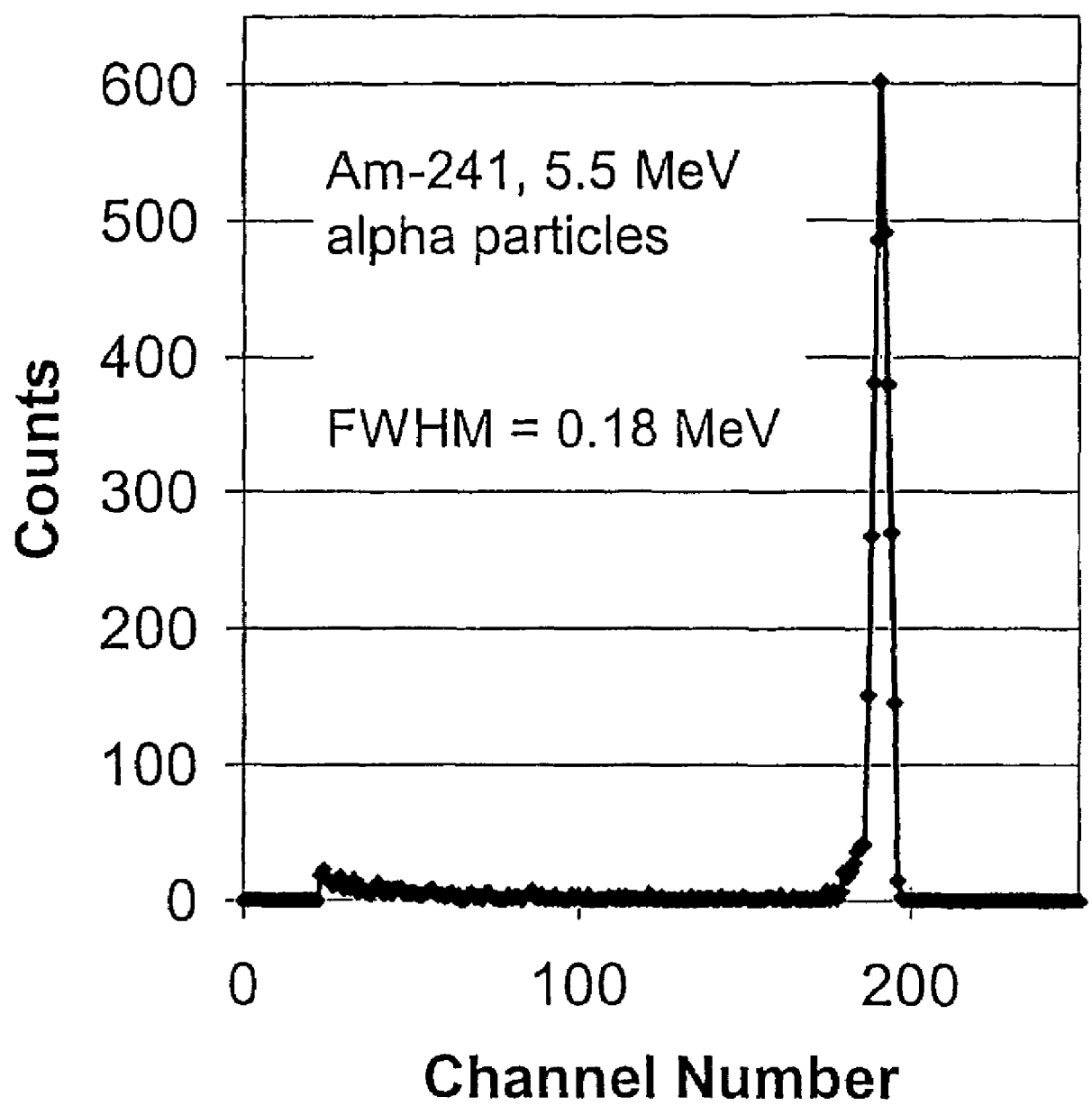
FIG. 3 is a plot of counts against channel number for alpha particle radiation.

The output from the multichannel analyser is a single, narrow peak (full width at half maximum of ~0.18 MeV) with a signal to noise ratio of approximately 50 (FIG. 3). Alpha particle detectors reported made from polycrystalline CVD diamond and reported in the literature (e.g. Foulon, F. et al (1998) 'Neutron detectors made from chemically vapour deposited semiconductors', Mat. Res. Soc. Symp. Proc., 487, 591-596) have a broad ill-defined peak that is not useful as a detector. The diamond detector of the invention can thus be used as an alpha particle detector in, for example, well logging.

The conventional way of describing the energy resolution of such a detector, being generally more fundamental than the absolute width of the energy peak, is to use the ratio of the width of this peak (the FWHM) δE, to the energy at which it is measured E. In this instance this gives δE=0.18 MeV, and E=5.5 MeV, and an energy resolution 0.18/5.5=3.3%.

EXAMPLE 3

Neutron Detector.

A neutron detector is prepared in a similar manner to an alpha detector described in Example 2 except that an additional 'converter layer' of material with a high neutron capture cross section, such as Boron-10, is placed on or adjacent to one electrode. The thickness of the converter layer is typically 0.1-10 µm thick. With a boron-10 converter layer, each captured neutron yields an alpha particle. Some of the alpha particles enter the diamond and are detected by the charge carriers they generate.

The invention claimed is:

1. A method of detecting radiation comprising:
providing a layer of high purity single crystal CVD diamond having at least one of,
(i) in an off state, a resistivity $R_1$ greater than $1 \times 10^{12}$ Ω cm measured at an applied field of 50 V/µm and 300 K,
(ii) a µτ product greater than $1.5 \times 10^{-6}$ cm$^2$/V, measured at an applied field of 10 V/µm and 300 K,
(iii) an electron mobility ($\mu_e$) measured at 300 K greater than 2400 cm$^2$V$^{-1}$s$^{-1}$,
(iv) a hole mobility ($\mu_h$) measured at 300 K greater than 2100 cm$^2$V$^{-1}$s$^{-1}$, and (v) a high charge collection distance greater than 150 µm, measured at an applied field of 1 V/µm and 300 K;
applying an electric field of no greater than 0.5 V/µm to the layer;
exposing the layer to the radiation thereby generating a signal; and
detecting the signal.

2. A method according to claim 1 wherein the electric field applied to the diamond layer is less than 0.3 V/µm.

3. A method according to claim 1 wherein the electric field applied to the diamond layer is less than 0.2 V/µm.

4. A method according to claim 1 wherein the electric field applied to the diamond layer is less than 0.15 V/µm.

5. A method according to claim 1 wherein a thickness of the layer does not exceed 1 mm.

6. A method according to claim 1 wherein a thickness of the layer is less than 500 µm.

7. A method according to claim 1 wherein a thickness of the layer is less than 250 µm.

8. A method according to claim 1 wherein a bias voltage less than 300 V is applied to the layer.

9. A method according to claim 1 wherein a bias voltage less than 200 V is applied to the layer.

10. A method according to claim 1 wherein a bias voltage less than 100 V is applied to the layer.

11. A method according to claim 1 wherein a bias voltage less than 75 V is applied to the layer.

12. A method according to claim 1 wherein the CVD diamond layer reaches at least 80% of saturated charge collection efficiency at the applied electric field.

13. A method according to claim 1 wherein the CVD diamond layer reaches at least 90% of saturated charge collection efficiency at the applied electric field.

14. A method according to claim 1 wherein the CVD diamond layer reaches at least 95% of saturated charge collection efficiency at the applied electric field.

15. A method according to claim 1 wherein the CVD diamond layer is capable of generating at least 7000 electrons per detection event for minimum ionising particles when operated at the applied electric field.

16. A method according to claim 1 wherein the CVD diamond layer is capable of generating at least 9000 electrons per detection event for minimum ionising particles when operated at the applied electric field.

17. A method according to claim 1 wherein the CVD diamond layer is capable of generating at least 12000 electrons per detection event for minimum ionising particles when operated at the applied electric field.

18. A method according to claim 1 wherein the CVD diamond layer is capable of generating at least 15000 electrons per detection event for minimum ionising particles when operated at the applied electric field.

19. A method according to claim 1 wherein the radiation is alpha particles and the CVD diamond is such that it generates a peak width (FWHM) in energy, expressed as $\delta E/E$, less than 20%.

20. A method according to claim 1 wherein the radiation is selected from beta particles, alpha particles, protons, other high energy nuclear particles, and high energy electromagnetic radiation.

21. A method according to claim 1 wherein the radiation is neutrons.

22. A detector including a stand-alone, remote or hand-held device comprising: a layer of high purity single crystal CVD diamond configured to operate at a bias voltage of less than 100V and having one or more of,
(i) in an off state, a resistivity $R_1$ greater than $1 \times 10^{12}$ Ω cm measured at an applied field of 50 V/µm and 300 K,
(ii) a µτ product greater than $1.5 \times 10^{-6}$ cm$^2$/V, measured at an applied field of 10 V/µm and 300 K.
(iii) an electron mobility ($\mu_e$) measured at 300 K greater than 2400 cm$^2$V$^{-1}$s$^{-1}$,
(iv) a hole mobility ($\mu_h$) measured at 300 K greater than 2100 cm$^2$V$^{-1}$s$^{-1}$, and
(v) a high charge collection distance greater than 150 µm, measured at an applied field of 1 V/µm and 300 K;

23. A detector according to claim 22 wherein the layer of high purity single crystal CVD diamond has a thickness of less than 1 mm.

* * * * *